(12) United States Patent
Kim et al.

(10) Patent No.: US 6,833,884 B2
(45) Date of Patent: Dec. 21, 2004

(54) IMAGE DISPLAY DEVICE EMPLOYING OPTICAL COMPENSATION FILM

(75) Inventors: Sang-Il Kim, Suwon-si (KR); In-Sun Hwang, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 201 days.

(21) Appl. No.: 10/218,391

(22) Filed: Aug. 14, 2002

(65) Prior Publication Data

US 2003/0048400 A1 Mar. 13, 2003

(30) Foreign Application Priority Data

Sep. 4, 2001 (KR) ......................................... 2001-54252

(51) Int. Cl.$^7$ ............................................. G02F 1/1335
(52) U.S. Cl. ........................................ 349/62; 349/112
(58) Field of Search ................................. 349/117, 119, 349/95, 62, 112

(56) References Cited

U.S. PATENT DOCUMENTS

| | | | |
|---|---|---|---|
| 5,555,476 A | 9/1996 | Suzuki et al. ................. 359/40 |
| 5,666,175 A | 9/1997 | Spitzer et al. ................. 349/95 |
| 5,706,065 A | * 1/1998 | Yano ........................... 349/112 |
| 5,724,111 A | 3/1998 | Mizobata et al. ............ 349/112 |
| 5,973,833 A | * 10/1999 | Booth et al. ................. 359/487 |

* cited by examiner

Primary Examiner—Tarifur R. Chowdhury
Assistant Examiner—Thoi V. Duong
(74) Attorney, Agent, or Firm—Cantor Colburn LLP

(57) ABSTRACT

There is disclosed an optical compensation film which is used for a liquid crystal display device to improve visual angle and gray scale properties. At least one protrusion is formed on a second transparent film having a second refractive index and is partly engaged with a first transparent film having a first refractive index. In the engaged area between the first and second transparent films, the progression direction of light at an overlapped portion in which the first and second transparent films are in contact with each other, is different from that of the light at a non-overlapped portion in which there is a gap between the first and second transparent films. The optical compensation film prevents gray scale inversion phenomenon and improves visual angle of a display device.

16 Claims, 23 Drawing Sheets

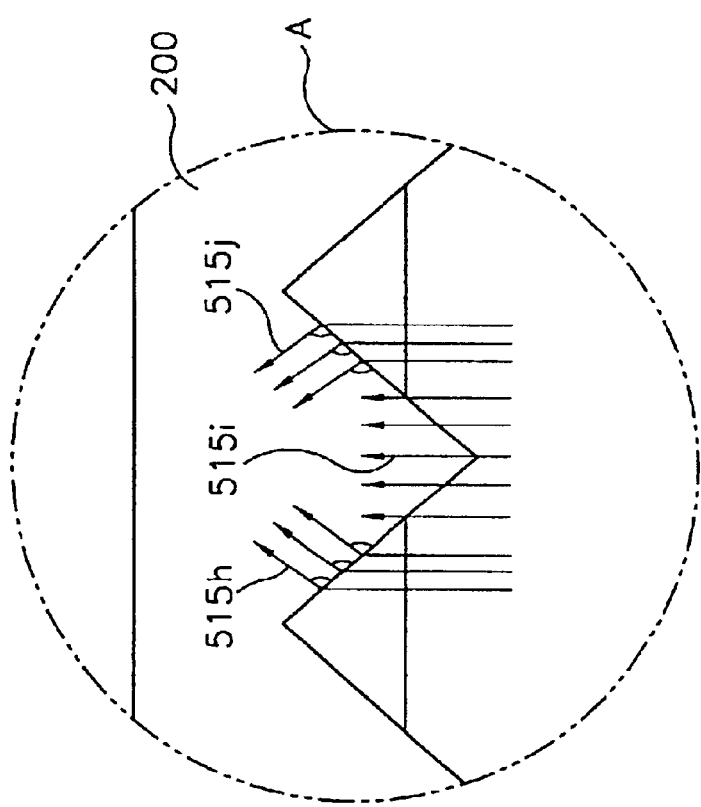

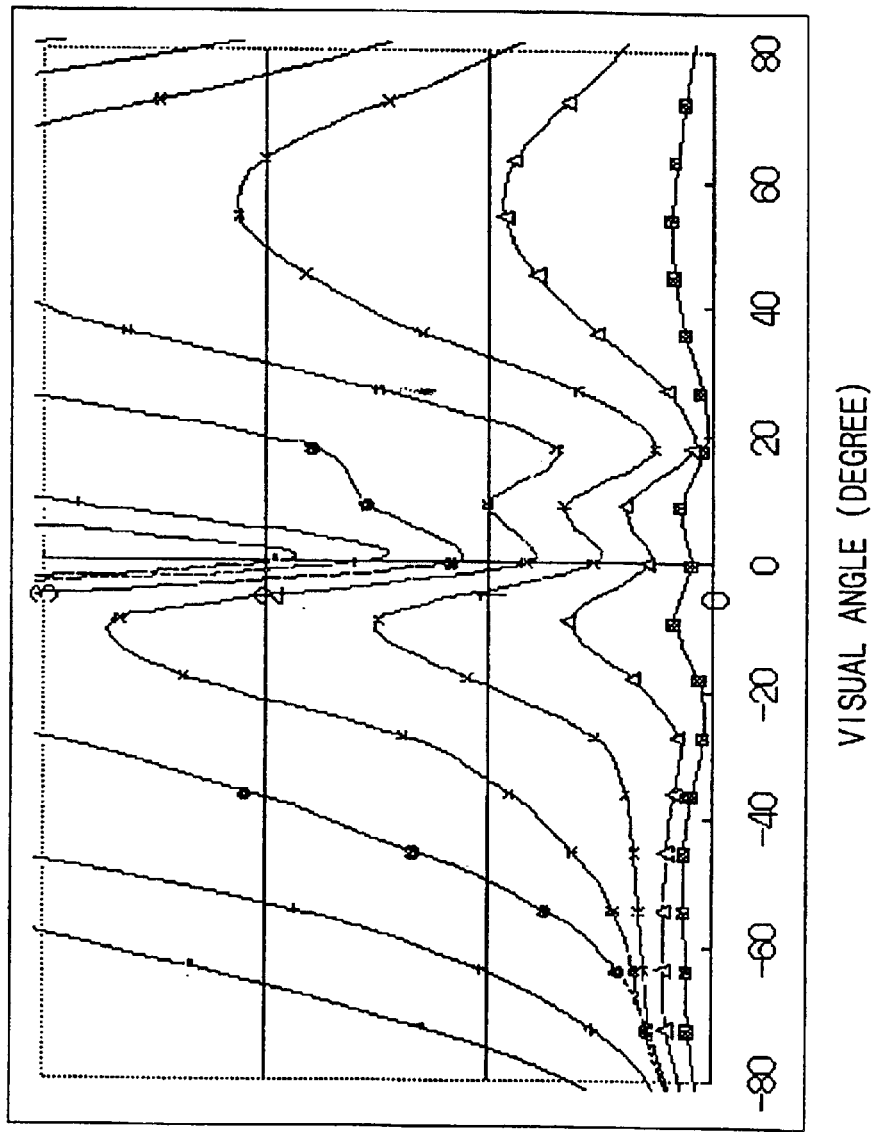

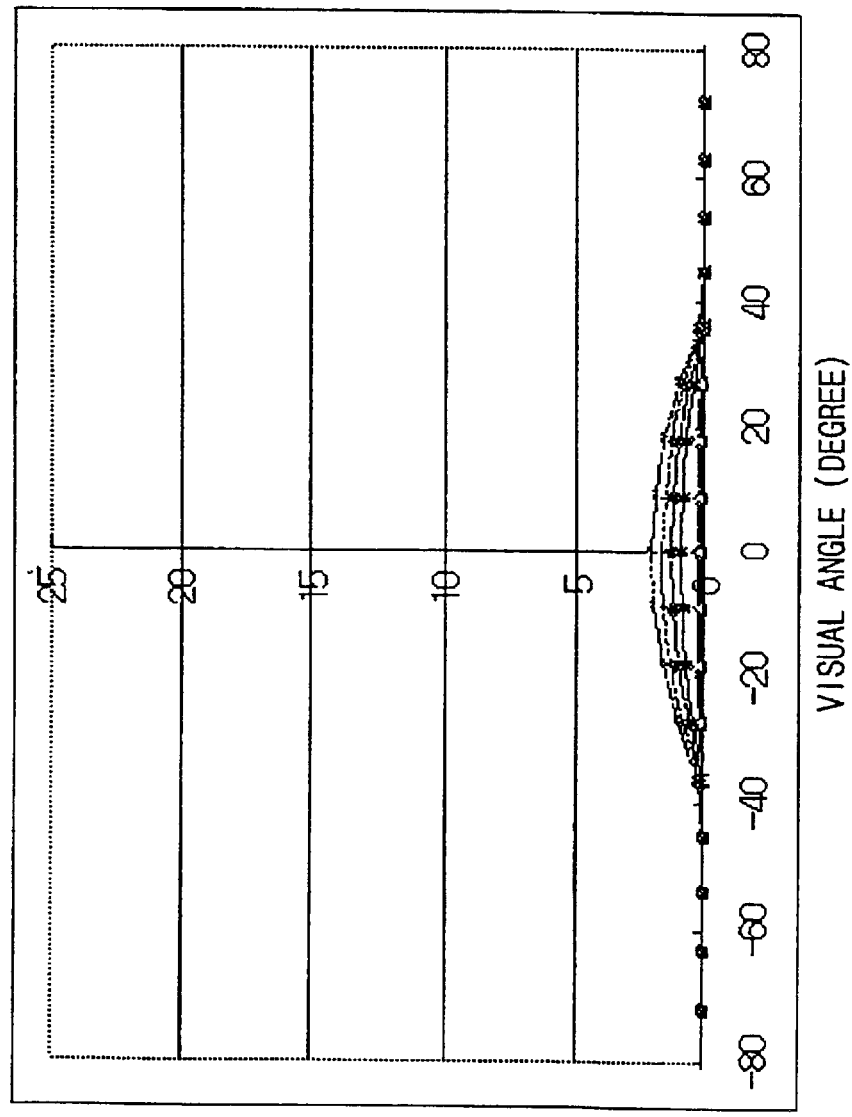

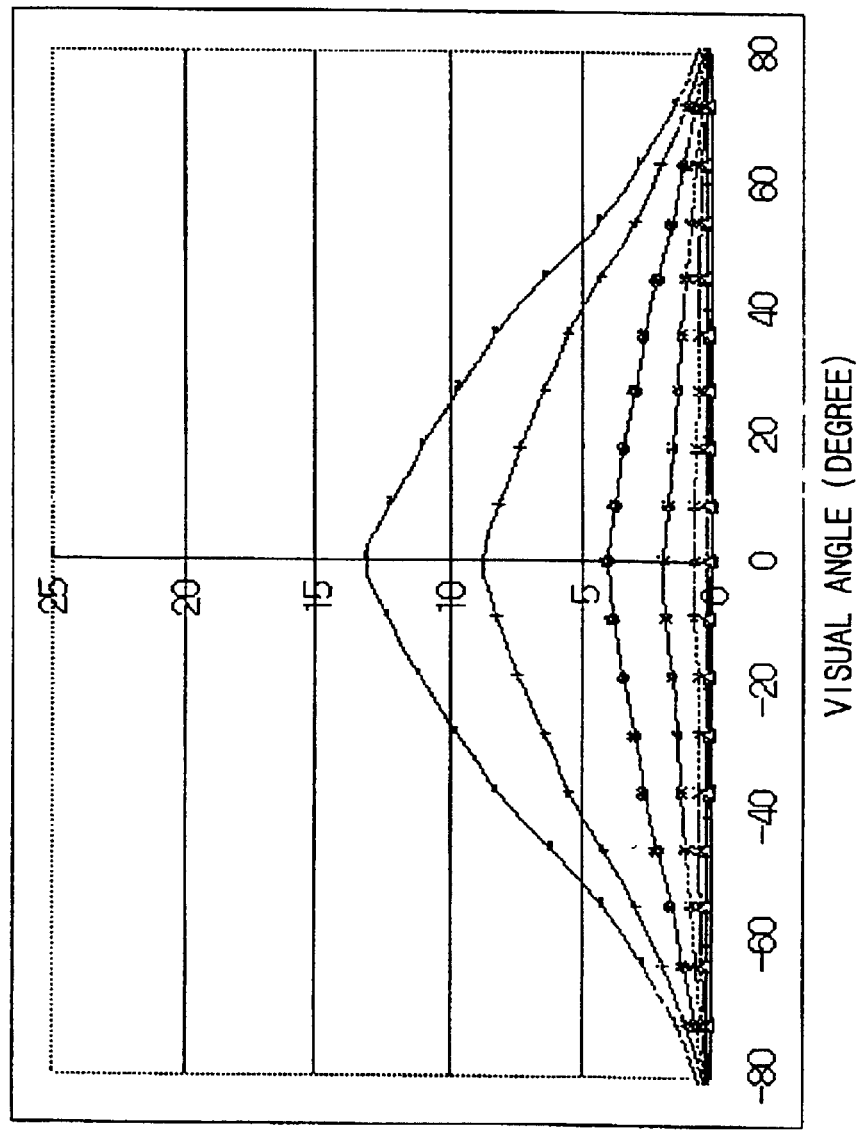

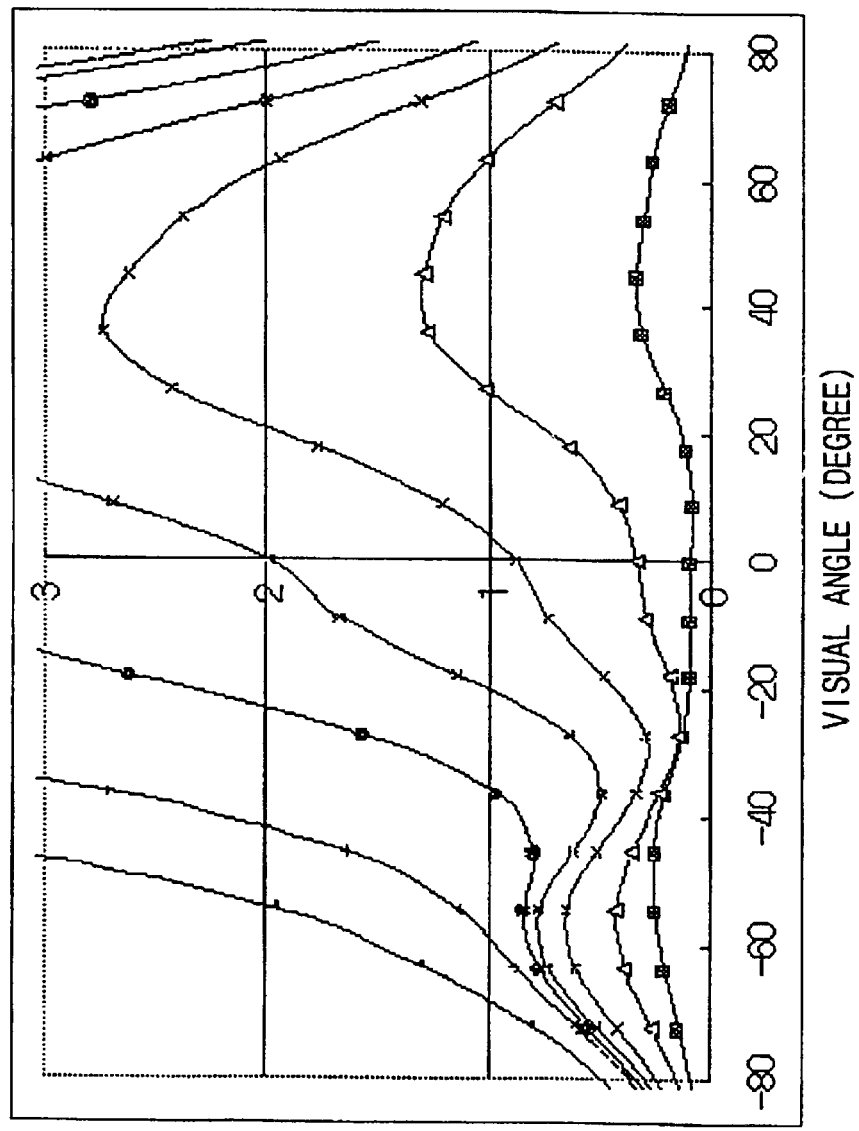

IMAGE DISPLAY DEVICE EMPLOYING OPTICAL COMPENSATION FILM

BACKGROUND OF THE INVENTION

1. Field of the Invention

The present invention relates to a device for displaying images, more particularly, to a display device employing an optical compensation film for improving visual angle and gray scale properties of the display device.

2. Description of the Related Art

Generally, a display device displays data which is obtained in the form of electric signals from a data processing unit so that a user can recognize the data. Display devices may be classified into a digital display device group and an analog display device group according to a driving method.

LCD (Liquid Crystal Display) device is one of the typical digital display devices. An LCD device has advantages such as capabilities of realizing a large-scaled screen, a high resolution, having a small size and weight, etc.

CRT (cathode ray tube) type display device is a typical analog display device. A CRT type display device has an advantage in that it facilely realizes a large-scaled screen and a high resolution at a low cost. However, the CRT type display device has disadvantages such as larger volume and heavier weight than an LCD device having the same screen size.

Hence, the LCD technology has been developed, and there is a trend of replacing CRT type display devices with LCD devices. The recent research on LCD devices has been focused on the technical development and improvement of the driving method and structure thereof. Therefore, it has been realized that LCD devices have high display quality by improving the driving method and reduced size and weight by improving the structure thereof.

In spite of the development in the driving method and structure of LCD devices, there are continuing problems such as gray scale inversion phenomenon occurring in twisted nematic (TN) LCD devices.

The gray scale inversion phenomenon means that the gray scale is inversed in an image. Generally, in an LCD device, the larger the intensity of a driving signal is, the higher its brightness is. However, in spite of the large intensity of a driving signal, there may be a portion on a display device, in which the brightness is relatively lowered. This phenomenon is called the gray scale inversion phenomenon and frequently occurs in LCD devices. The gray scale inversion phenomenon is an obstructive factor in realizing the high display quality.

Further, the gray scale inversion phenomenon causes the brightness to be lowered. This exerts a bad influence on a visual angle in which a contrast ratio is defined to 10:1 or more. As a result, the visual angle is narrowed.

Here, the fact that the visual angle is narrowed means that even if an angle formed between user's eyes and the surface of an LCD device is slightly changed, there may be a portion in which the user cannot recognize the content of displayed information on the LCD device. This is also an obstructive factor in realizing the high display quality.

Although the gray scale inversion phenomenon may not directly affect the display operation of an LCD device, it causes the visual angle to be narrowed, thereby substantially degrading display property of the LCD device.

To solve the problem of reducing the visual angle due to the gray scale inversion phenomenon, there have been provided optical compensation films. However, the conventional optical compensating films do not solve the problem of the gray scale inversion phenomenon which is a major obstructive factor in degrading the visual angle property.

In addition, when the conventional optical compensating film is applied to a TN LCD device having improved two domains, one of the two domains is compensated but the other domain is not compensated. As a result, the TN LCD device may have a problem of "trade-off" between the gray scale inversion phenomenon and the visual angle property.

SUMMARY OF THE INVENTION

It is an object of the present invention to provide an optical compensation film which is applied to a display device to prevent an occurrence of the gray scale inversion phenomenon and thus to increase the visual angle.

It is another object of the present invention to provide a method of manufacturing the optical compensating film by which an occurrence of the gray scale inversion phenomenon is prevented and the visual angle is increased.

It is another object of the present invention to provide an illuminating method in a display device using the optical compensating film by which an occurrence of the gray scale inversion phenomenon is prevented and the visual angle is increased.

It is still another object of the present invention to provide a display device in which an occurrence of the gray scale inversion phenomenon is prevented and the visual angle is increased, thereby improving the display quality.

To achieve the above and other objects of the present invention, there is provided an optical compensation film. In the optical compensation film, a first transparent member is formed on a substrate. The first transparent member has a recessed portion and a first refractive index. Light that has passed through the substrate passes through the first transparent member. A second transparent member has a protruded portion partly engaged with the recessed portion. The second transparent member has a second refractive index which is substantially the same as the first refractive index. The light passes in a first direction through an overlapped portion where the protruded portion of the second transparent member is in contact with the recessed portion of the first transparent member, and the light passes in a second direction which is different from the first direction through a non-overlapped portion in which there is a gap between the protrusion portion of the second transparent member and the first transparent member.

In anther aspect of the present invention, there is provided a method of manufacturing an optical compensation film. In the method, a first transparent member having a first refractive index is formed on a substrate. A second transparent member having a plurality protruded portions and a second refractive index, which is substantially the same as the first refractive index of the first transparent member, is aligned with the first transparent member. The protruded portions of the second transparent member are partly engaged with the first transparent member at a predetermined depth. The first transparent member is then cured.

In another aspect of the present invention, there is provided an illuminating method in a display device. Light generated from a light source is processed to form display light for displaying an image and then is supplied in a first direction. A part of the display light passes through a first position having the substantially same refractive index as that of a medium, continues to be supplied in a first direction and then reaches to user's eyes, and the rest of the display light passes through a second position having a different refractive index than the medium, continues to be supplied in a second direction different from the first direction and then reaches to the user's eyes.

In another aspect of the present invention, there is provided an LCD device. In the LCD device, an LCD panel assembly has an LCD panel in which a liquid crystal layer is sandwiched between two transparent substrates for controlling electric field therebetween in a unit of a minute surface area. The transmissivity of the liquid crystal layer is changed depending on intensity of the electric field. An optical path changing film has a first transparent member and a second transparent member. The first transparent member is disposed on the LCD panel with a recessed portion. The first transparent member has a first refractive index, and light that has passed through the substrate passes through the first transparent member. The second transparent member has a protruded portion partly engaged with the recessed portion of the first transparent member. The second transparent member has a second refractive index which is substantially the same as the first refractive index. A backlight assembly provides light to the liquid crystal layer. The light advances in a first direction at an overlapped portion in which the protruded portion is in contact with the recessed portion, and advances in a second direction that is different from the first direction at a non-overlapped portion in which there is a gap between the protruded portion of the second transparent member and the first transparent member.

According to the present invention, visual angle property of a display device is remarkably improved and the gray scale inversion phenomenon is solved using the optical compensation film, thereby improving the display property. Further, the method of manufacturing the optical compensation film is improved, thereby manufacturing a precise film for compensating the optical property with a simple method.

BRIEF DESCRIPTION OF THE DRAWINGS

The above and other objects and advantages of the present invention will become more apparent by describing exemplary embodiments of the present invention with reference to the attached drawings in which:

FIG. 11 is an enlarged view of portion A of FIG. 10;

FIGS. 13A to 13C are graphs showing simulation results of a second comparison example of Table 1;

FIGS. 14A to 14C are graphs showing simulation results of a first embodiment of Table 1; and FIGS. 15A to 15C are graphs showing simulation results of a second embodiment of Table 1.

DETAILED DESCRIPTION OF THE INVENTION

Now, exemplary embodiments of the present invention will be described in detail with reference to the accompanying drawings.

Figure 1:
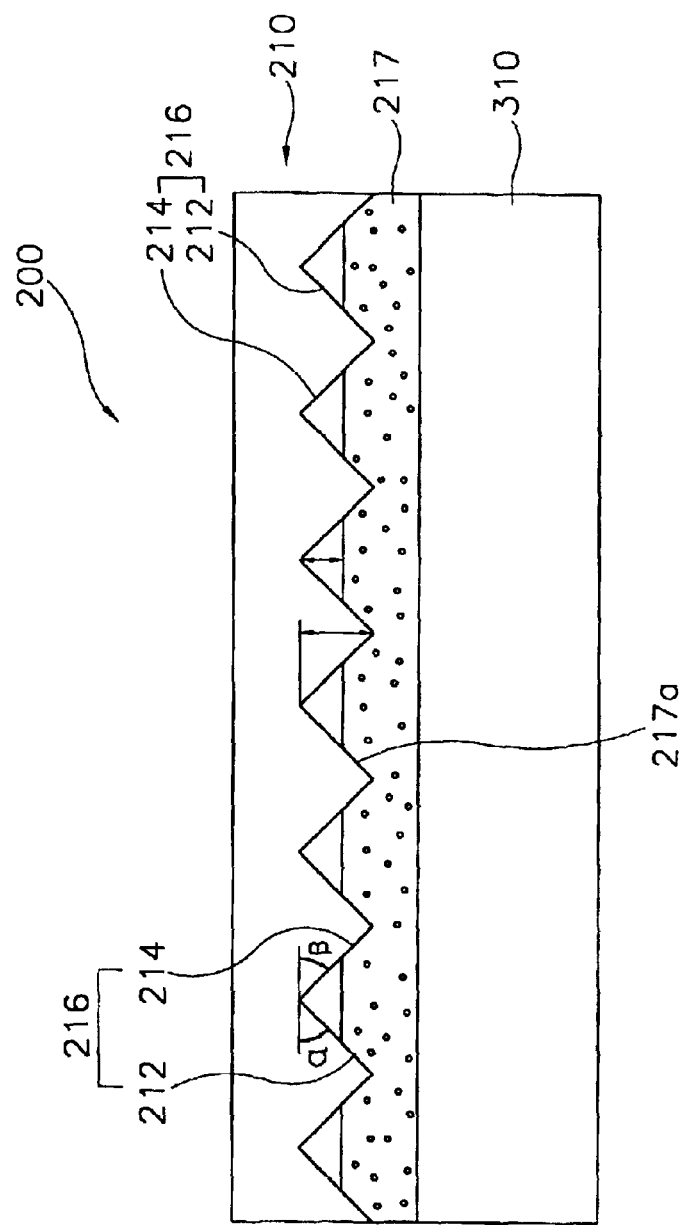
FIG. 1 is a cross-sectional view of an optical compensation film in accordance with one embodiment of the present invention.

FIG. 1 shows an embodiment of a film 200 for compensating the optical property of incident light. In FIG. 1, a substrate 310 transmits light or allows optical property of the light to be changed while the light is transmitted. The substrate 310 may have a polarizing function of the light.

The film 200 for compensating optical property is provided on an upper surface of the substrate 310. Hereinafter, the film 200 for compensating optical property is called "optical compensation film". Preferably, the optical compensation film 200 includes a first transparent film 217 and a second transparent film 210.

As one example, the first transparent film 217 has functions of fixing the second transparent film 210 onto the substrate 310 and changing optical paths of light provided through the substrate 310.

To allow the first transparent film 217 to fix the second transparent film 210 and to change the optical paths, recessed portions 217a each having a predetermined shape are formed at a surface of the first transparent film 217. The recessed portions 217a may have various shapes. For example, each recessed portion 217a may be a groove having a V-shaped profile, and successively aligned with one another in the form of a stripe. The recessed portions 217a may also have, for example, a triangular pyramidal shape, a quadrangular pyramidal shape, a pentagonal pyramidal shape, a polygonal pyramid shape or a cone shape with a circular surface.

Figure 2:
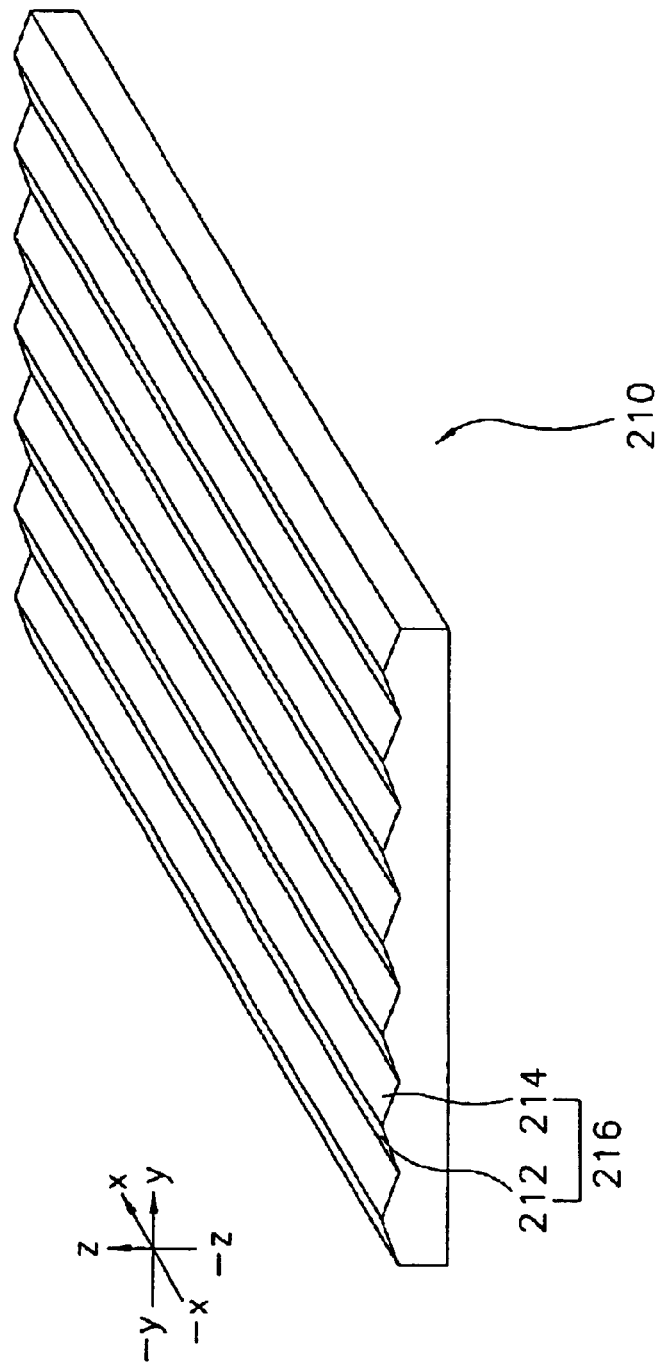
FIG. 2 is a perspective view of a second transparent film in accordance with one embodiment of the present invention.

The second transparent film 210 is partially coupled to the upper surface of the first transparent film 217 having the recessed portions 217a. The second transparent film 210 has protrusions 216 corresponding to the respective recessed portions 217a such that each protrusion 216 is partly engaged with a corresponding recessed portion 217a. For example, in case that the recessed portions 217a are V-shaped grooves that are successively aligned in the form of long stripes, as shown in FIG. 1, each protrusion 216 of the second transparent film 210 has a prism-shaped pole corresponding to the V-shaped profile of the recessed portion 217a, as shown in FIG. 2.

As described above, the first transparent film 217 has the recessed portions 217a each having a desired profile or configuration. The protrusions 216 of the second transparent film 210 each have a desired shape corresponding to the profile or configuration of the recessed portion 217a. Hereinafter, the optical and physical properties of the first and second transparent films 217, 210 will be described in detail.

The first transparent film 217 of the optical compensation film 200 has a first refractive index and the second transparent film 210 has a second refractive index. The first refractive index is substantially the same as the second refractive index. In other words, when the light passes through a portion in which the first transparent film 217 is overlapped with the second transparent film 210, an angle variation of a changed optical path is within a predetermined range. It is noted that numerical values of the first and second refractive indexes of the first and second transparent films 217 and 210 are not important. A difference between the first and second refractive indexes is an important factor in the optical compensation according to the present invention. It is preferable that the difference between the first and second refractive indexes is about 0.1 or less. It is desirable that the difference is zero.

A depth of the overlapped portion between the recessed portion 217a formed on the first transparent film 217 and the protrusion 216 (or a protrusion 218 in FIG. 4) formed on the second transparent film 210 is also very important. This is because gray-scale inversion phenomenon and visual angle property are improved or degraded according to the depth of the overlapped portion. Therefore, the depth of the overlapped portion between the protrusion 216 and the recessed portion 217a can be controlled based on the gray-scale inversion phenomenon and visual angle property.

According to one embodiment of the present invention, the first transparent film 217 is made of material having a fluidity as well as adhesion, and the first transparent film 217 is combined with the second transparent film 210 such that the first transparent film 217 is overlapped with the protrusion 216 of the second transparent film 210. The first transparent film 217 is made of fluidic material having no defined shape. The fluidic material has adhesive property and the first refractive index. For example, transparent glue which is cured depending on the lapse of time, i.e., condition-dependent curable, may be used for the first transparent film 217.

In another embodiment of the present invention, the first transparent film 217 has properties of fluidity and the first refractive index, and may be made of, for example, UV (ultraviolet) curing agent (or hardening agent) which is cured in a particular condition such as under exposure to ultraviolet radiation.

The second transparent film 210 may be a rigid and solid film. The protrusions 216 formed on the second transparent film 210 may have various shapes. For example, in its cross-sectional view, a protrusion may have a narrowed end portion extended from the second transparent film 210, as shown in FIGS. 1–4.

In one embodiment of the present invention, the protrusion 216 of the second transparent film 210 has a prism-shaped profile. Therefore, as shown in FIG. 1, the protrusion 216 of the second transparent film 210 has two inclined surfaces 212 and 214. In this embodiment, one of the two inclined surfaces is defined as a first inclined surface 212. The other of which one side make contact with one side of the first inclined surface 212 is defined as a second inclined surface 214. In FIG. 1, "α" represents an angle between the first inclined surface 212 and the horizontal plane, and "β" represents an angle between the second inclined surface 214 and the horizontal plane. The relationship between angle α and angle β is (α+β)<1800. Each of the angles α and β is in the extent of about 10° to 90°. Further, the angles α and β may be the same or different from each other.

Ranges of visual angles between right and left sides and top and bottom of a display device are increased or decreased according to the angles α and β. Therefore, when designing an LCD, the angles α and β are carefully considered to obtain a desired visual angle.

Figure 3:
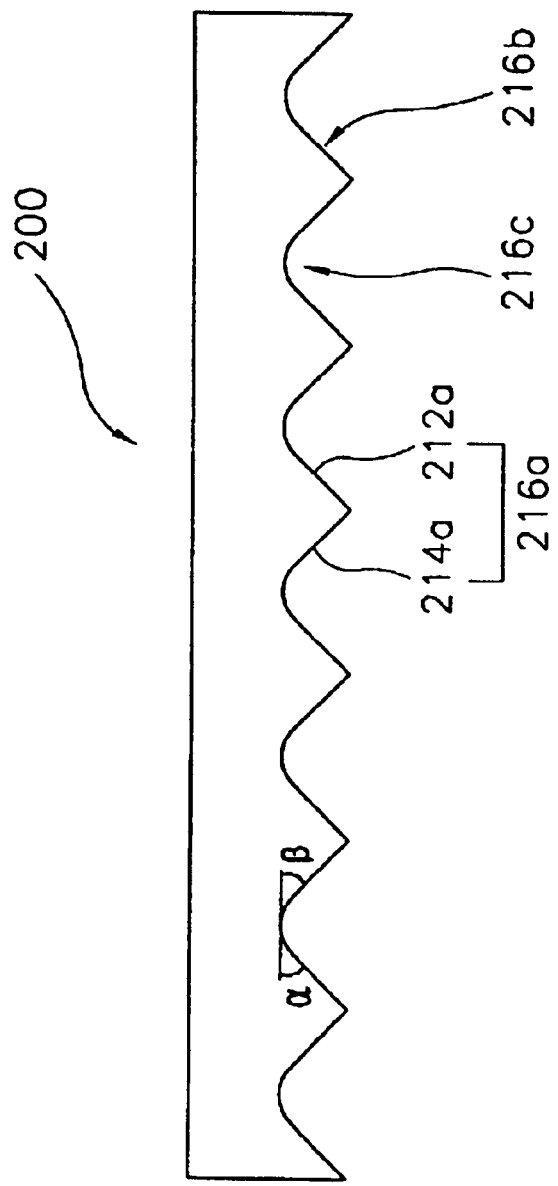
FIG. 3 is a cross-sectional view of the second transparent film in accordance with another embodiment of the present invention.

The protrusions on the second transparent film 210 may have a different shape. For example, as shown in FIG. 3, a boundary portion 216c between the adjacent protrusions is rounded to have a smooth curve. As a result, the light from a substrate smoothly and successively passes the optical compensation film without being discrete.

Figure 4:
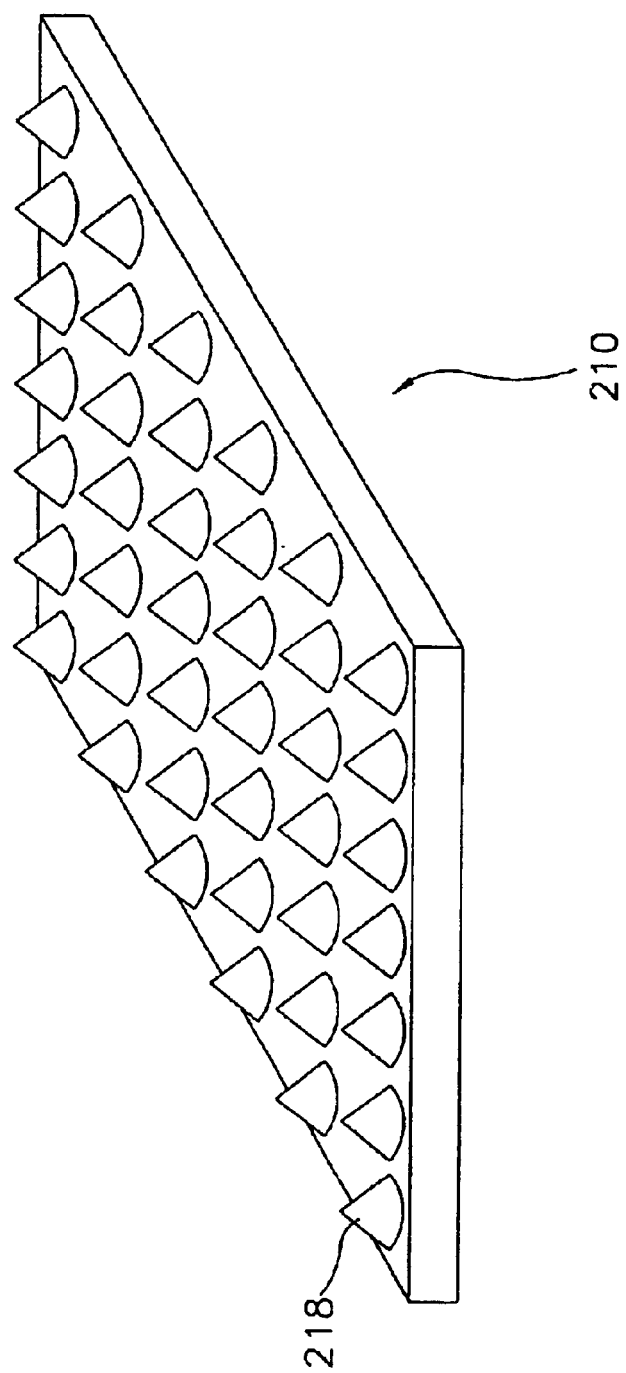
FIG. 4 is a perspective view of the second transparent film in accordance with a further embodiment of the present invention.

FIG. 4 shows another embodiment of the second transparent film 210. Protrusions 218 of the second transparent film 210 are formed in the form of dots protruded on the surface of the second transparent film 210. In its cross-sectional view, each protrusion 218 has a narrowed end portion and a gradually widened portion extended from the second transparent film 210.

The protrusion 218 protruded in a desired height may have a polygonal pyramid shape having three or more side surfaces. For example, the protrusion 218 may have a cone shape to have a circular surface. When the protrusions 218 have a circular cone shape, as shown in FIG. 4, the visual angle is improved to the angle of about 360°. Also, the gray scale inversion phenomenon is substantially reduced or prevented.

Hereinafter, a method for combining the first and second transparent films 217, 210 will be described in detail.

Referring to FIG. 1, a first transparent film 217 is formed on a substrate 310 to have a desired thickness. Then, a second transparent film 210 is overlapped on the first transparent film 217. The second transparent film 210 may be, for example, one of the embodiments in FIGS. 2–4. At the time of the overlap, each protrusion 216 of the second transparent film 210 is not entirely merged into the first transparent film 217, but partly merged into the first transparent film 217 as shown in FIG. 1.

The reason why each of the protrusions 216 of the second transparent film 210 is partly engaged with the first transparent film 217 is that this structure, as described above, solves the problems of the visual angle and the gray scale inversion phenomenon. The depth of a part of the protrusion 216 inserted into the first transparent film 217 is an important factor in determining the functions of an optical compensation film.

As shown in FIG. 1, an entire height of the protrusion 216 is defined as "H". When the protrusions of the second transparent film 210 are partly combined into the first transparent film, the height of a portion which is not merged into the first transparent film is defined as "h". Then, ratio L of a non-overlapped portion of the protrusion 216 to the entire protrusion 216 is defined as follows:

$$L = h/H \qquad \text{Equation 1}$$

In Equation 1, when the entire height H of the protrusion 216 of the second transparent film 210 is "1", and the height h is "0.4", the ratio L is "0.4/1" or "0.4". In other words, this means that 60% of the height of the protrusion 216 is inserted into the first transparent film 210.

Hereinafter, the influence on an optical path of the fact that the protrusion 216 of the second transparent film 210 is partly inserted into the first transparent film 217 will be described.

Referring to FIG. 11, a part of the light irradiated through the substrate 310 passes through the overlapped region of a protrusion of the second transparent film 210, which is inserted into the first transparent film 217. In this region, refraction of the light is ignorable or has a minimized value, since the refractive index of the first transparent film 217 is substantially the same as that of the second transparent film 210. Hereinafter, the light passing through the overlapped region is called straight light 515$i$.

The rest of the light irradiated through the substrate 310 is incident into the air, which is a different medium from the first transparent film 217, through the first transparent film 217. Then, the light is continuously moved and arrived at a surface of the protrusion of the second transparent film 210, which is not inserted into the first transparent film 217, and then is incident into the first transparent film 217. The optical path of the light 515$h$ and 515$j$ incident into the protrusion 216 of the second transparent film 210 is drastically changed due to the difference between the refractive indexes of the air and the second transparent film 210. Hereinafter, the light of which optical path is changed is defined as a first refracted light 515$h$ and a second refracted light 515$j$.

The amounts of the straight light 515$i$ and the first and second refracted light 515$h$ and 515$j$ are in reverse proportion to each other. For example, if the ratio L of the protrusion 216 non-inserted into the first transparent film 210 is minimized, the light amount of the straight light 511$i$ is increased, but the light amount of the first refracted light 515$h$ and the second refracted light 515$j$ is decreased. In this case, the visual angle is narrowed and the gray scale inversion phenomenon may occur. According to one embodiment of the present invention, the ratio L of the protrusion 216 non-inserted into the first transparent film 210 is preferably equal to or larger than about 0.05.

If the ratio L of the protrusion 216 non-inserted into the first transparent film 210 is maximized, the light amount of the straight light 515$i$ is at minimum. Then, the amount of the first and second refracted light 515$h$, 515$j$ is maximized. In this case, the visual angle at a front portion is largely reduced, thereby degrading the displaying property in the front view. According to another embodiment of the present invention, the ratio L of the protrusion 216 non-inserted into the first transparent film 210 is preferably equal to or less than about 0.7.

Accordingly, the ratio L of the protrusion 216 non-inserted into the first transparent film 210 is preferably controlled in the range between about 0.05 to about 0.7.

Hereinafter, a process of manufacturing the film 200 for compensating the optical property, which has the structure and the property as described above, will be described with reference to FIGS. 5 to 7.

Figure 5:
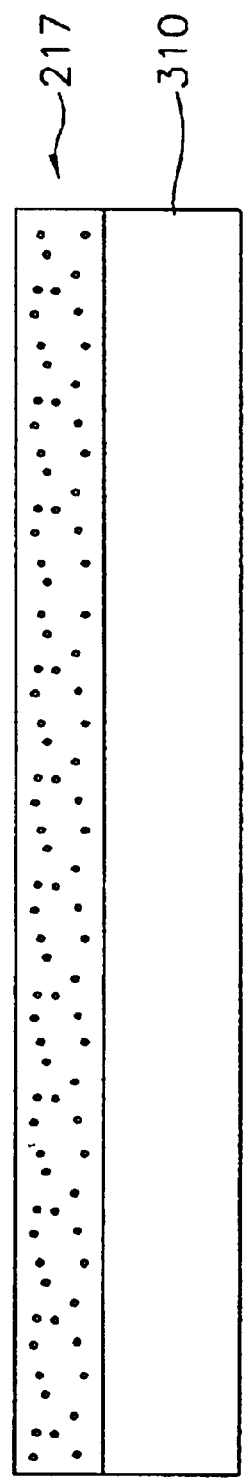
FIG. 5 is a cross-sectional view showing a state in which a first transparent film is formed on a substrate for illustrating a method for preparing an optical compensation film in accordance with one embodiment of the present invention.

Referring to FIG. 5, on the upper face of the substrate 310, there is formed the first transparent film 217 having a uniform thickness, which has the first refractive index and the fluidity and which is made of the transparent adhesive or the UV curing agent (or hardening agent).

Figure 6:
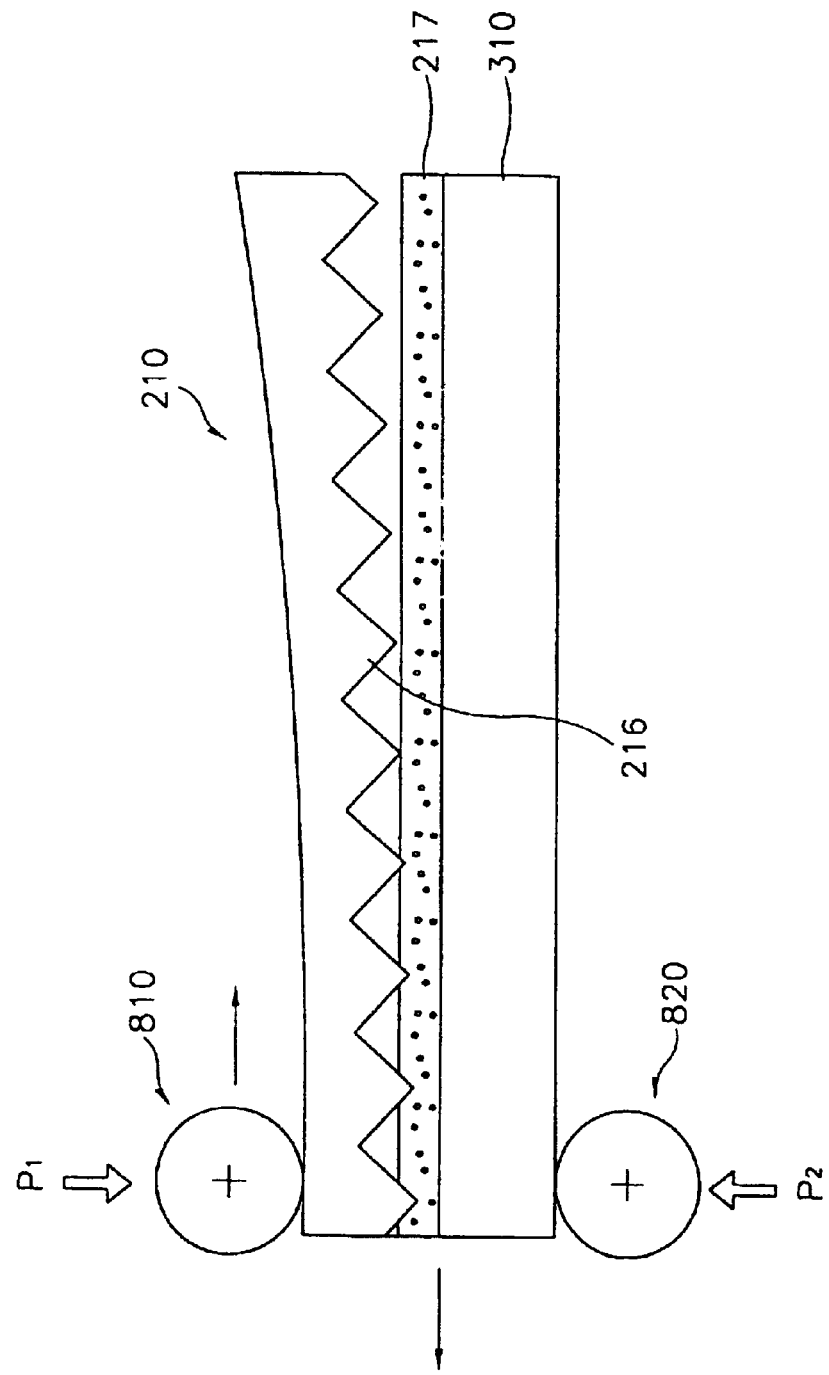
FIG. 6 is a cross-sectional view showing a state in which the first and second transparent films are pressed for illustrating a method for preparing an optical compensation film in accordance with one embodiment of the present invention.

Then, as shown in FIG. 6, the second transparent film 210 having the protrusions 216 as shown in FIGS. 1 to 4 is aligned with and stacked on the upper face of the first transparent film 217.

When the first and second transparent films 217, 210 are stacked, a first pressing roller 810 is placed at one side of the upper surface of the second transparent film 210 to press the second transparent film 210 at a predetermined pressure.

In anther embodiment, a second pressing roller 820 in addition to the first pressing roller 810 is provided on the bottom of the substrate 310 to simultaneously press the second transparent film 210 and the substrate 310 at desired pressures P1, P2, respectively.

The pressure applied by each of the first and second pressing rollers 810, 820 is precisely controlled. The ratio L of the protrusion 216 non-inserted into the first transparent film 210 is determined by the pressure applied to the first and second transparent films 217, 210.

Figure 7:
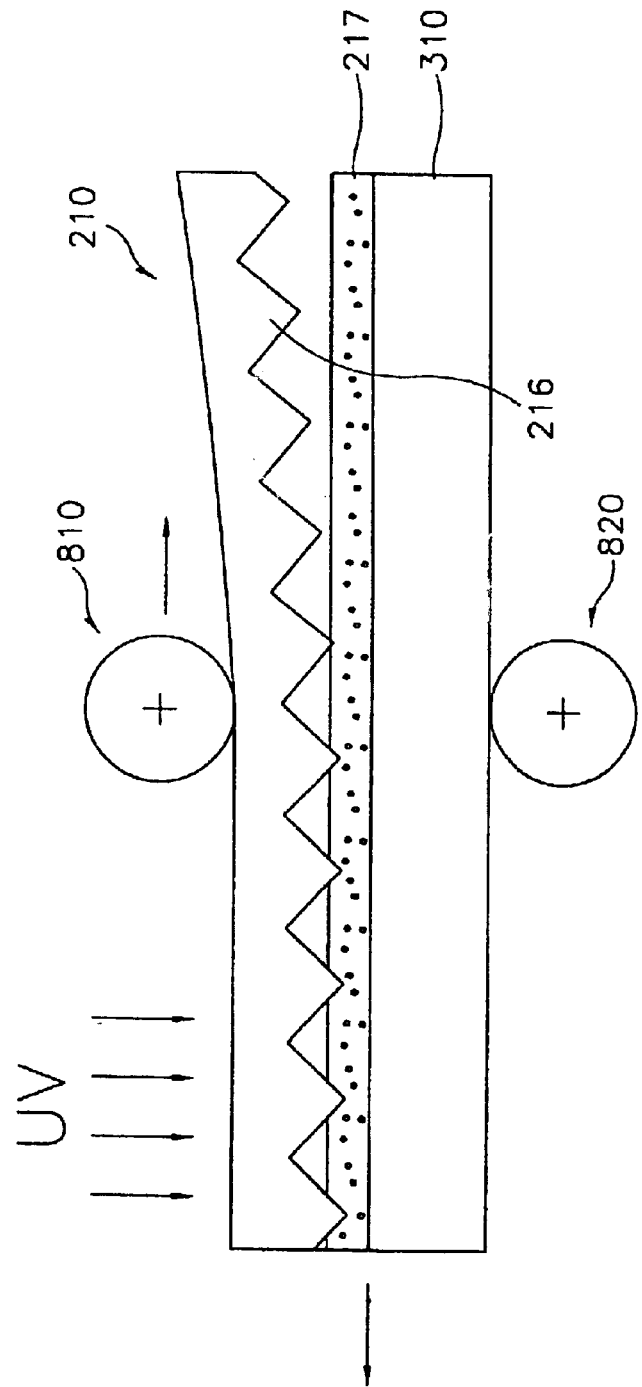
FIG. 7 is a cross-sectional view showing a state in which ultraviolet radiation is applied onto the first transparent film for illustrating a method for preparing an optical compensation film in accordance with one embodiment of the present invention.

As shown in FIG. 7, the first transparent film 217 is cured while the first and second pressing rollers 810, 820 precisely press the first and second transparent films 217, 210.

For example, there are provided two methods for curing the first transparent film 217. In a first embodiment, as shown in FIG. 7, ultraviolet radiation is applied along the path that the first and second pressing rollers 810, 820 precisely press the first and second transparent films 217, 210. In the first embodiment, while the second transparent film 210 is cured on the first transparent film 217, a change in position of the second transparent film 210 is substantially prevented.

In the second embodiment, after the first and second pressing rollers 810, 820 completely press the entire surface area of the first and second transparent films 217, 210, the ultraviolet radiation is applied onto the entire surface area of the first transparent film 217 to cure the first transparent film 217.

The film 200 for compensating the optical property fabricated by the method according to the present invention may be applied to a display device to prevent the gray scale inversion phenomenon and increase the visual angle.

Hereinafter, a display device in which the film 200 for compensating the optical property is employed and an illuminating method in the display device will be described.

Figure 8:
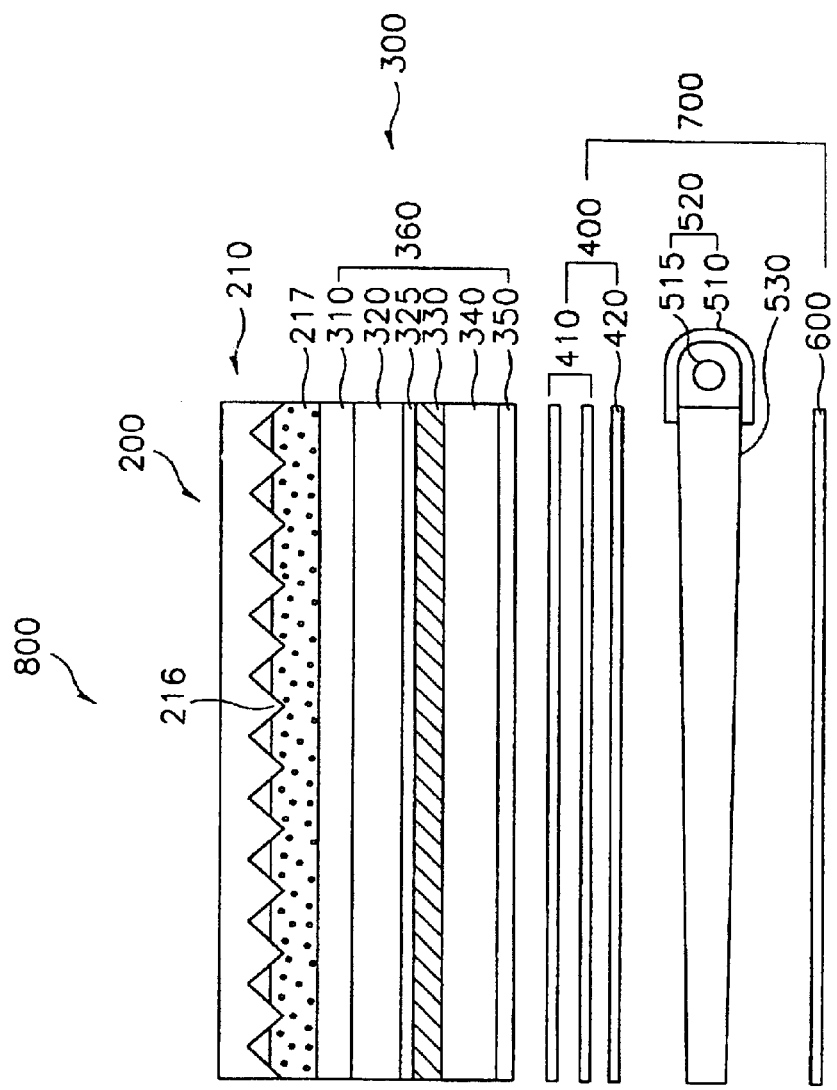
FIG. 8 is a cross-sectional view showing a state in which the optical compensating film is applied to a display device in accordance with the present invention.
Figure 9:
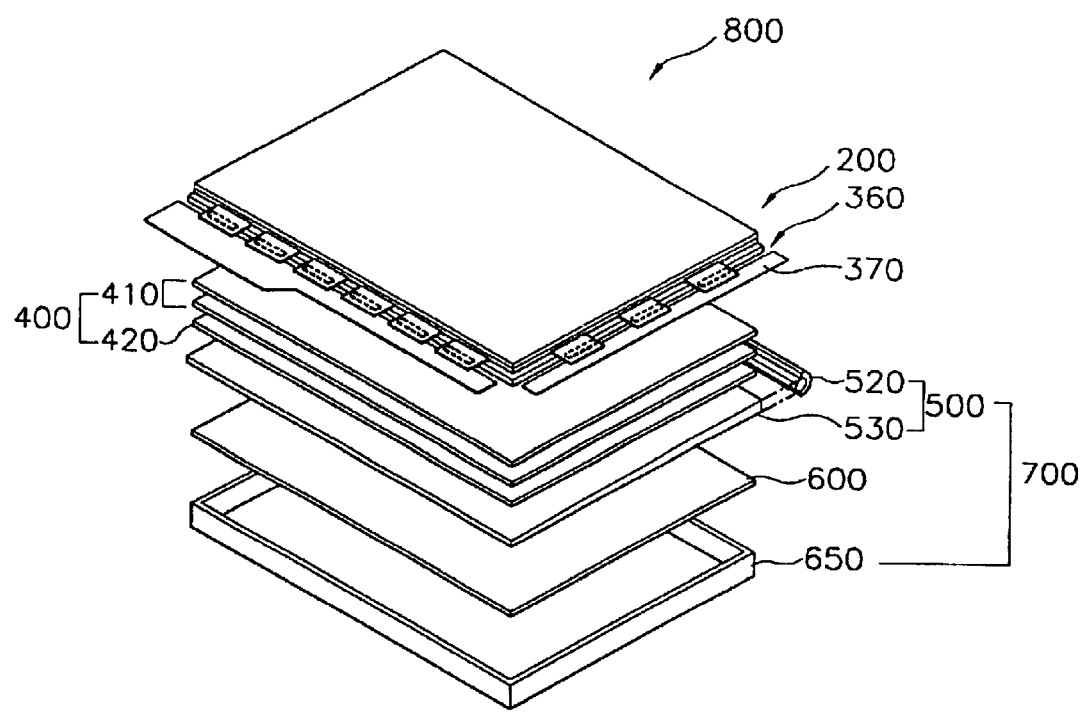
FIG. 9 is a perspective view of the display device of FIG. 8.

FIGS. 8 and 9 show a display device 800 in which the film 200 for compensating the optical property is employed. Referring to FIG. 8, the display device 800 is a liquid crystal display (LCD) device that precisely controls liquid crystal and displays information. The LCD device 800 includes the film 200 for compensating the optical property, an LCD assembly panel 300 and a backlight assembly 700.

The backlight assembly 700 of the LCD device 800 provides light for performing a display operation so that the LCD device 800 displays an image without an external light source. The backlight assembly 700 is not an essential element in a display device that performs the display operation using an external light source.

Referring to FIGS. 8 and 9, the LCD panel assembly 300 of the LCD device 800 includes an LCD panel 360 and a driving module 370. The LCD panel 360 has a TFT substrate 340, a color filter substrate 320, the liquid crystal 330, a first polarizing plate 350 and a second polarizing plate 310.

More particularly, the TFT substrate 340 controls intensity of power applied to each region which is one of a plurality of small surface areas divided from a large surface area. The color filter substrate 320 which is opposite to the TFT substrate 340 supplies a reference power. The first polarizing plate 350 is formed at the bottom of the TFT substrate 340, and liquid crystal 330 is injected between the TFT substrate 340 and the color filter substrate 320. The second polarizing plate 310 is formed at an upper face of the color filter substrate 320. Reference numeral 325 denotes a common electrode.

The driving module 370 of FIG. 9 is connected with the TFT substrate 340 to apply a driving signal to the TFT substrate 340.

The LCD panel assembly 300 cannot display an image at an area in which light is not sufficiently supplied. This is because of such property of the liquid crystal 330 that the liquid crystal 330 controls transmissivity of light but cannot produce light. Accordingly, the backlight assembly 700 is disposed under the LCD panel assembly 300 according to the property of the liquid crystal 330.

The backlight assembly 700 converts the light generated from a line light source or a dot light source into a surface light source having a plan light distribution, i.e., a uniform brightness distribution. The backlight assembly 700 includes a lamp assembly 520, a light guiding plate 530, an optical sheet group 400, a reflecting plate 600 and a receiving container 650, as shown in FIG. 9.

More particularly, the lamp assembly 520 includes a lamp 515 and a lamp cover 510. The lamp 515 generates light in all directions. The lamp cover 510 covers the lamp 515, and reflects the generated light in a desired direction. The light guiding plate 530 having a rectangular parallelepiped shape is coupled to the lamp assembly 520. The light guiding plate 530 allows the light generated from the lamp assembly 520 to have the surface light source distribution, and also functions to change a direction of the light.

The light output from the light guiding plate 530 has the surface light source distribution, but brightness uniformity of the light is low. Therefore, on an upper surface of the light guiding plate 530, there is disposed a diffusing plate 420 for diffusing the light. On an upper surface of the diffusing plate 420, there is disposed a prism sheet 410 for compensating direction of the diffused light.

On the surface of the second polarizing plate 310 of the LCD panel assembly 300, there is provided the film 200 for compensating the optical property to prevent the gray scale inversion phenomenon of the light displayed on the LCD panel assembly 300 and also to improve the visual angle property.

Figure 10:
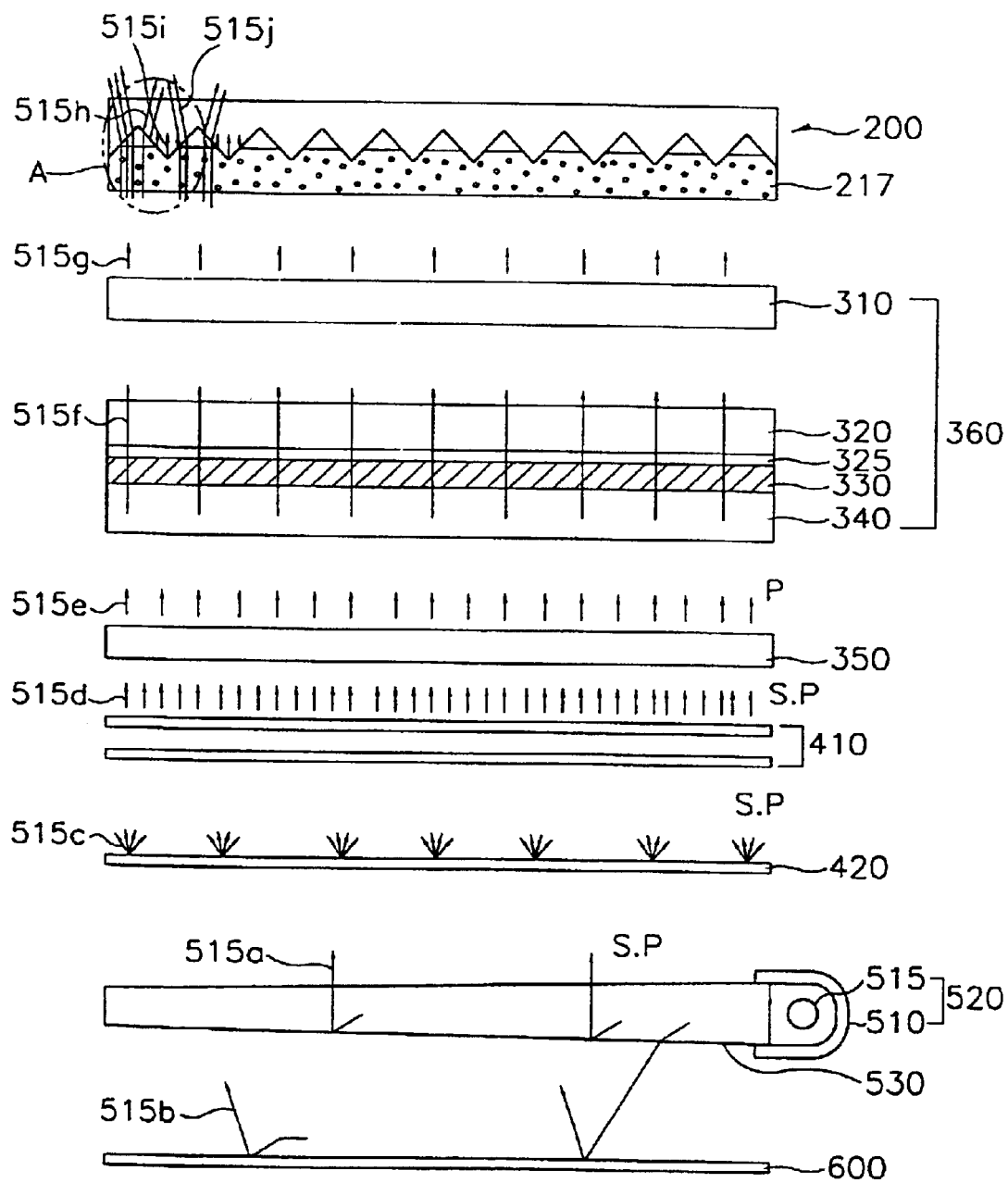
FIG. 10 is a schematic view showing an illuminating process in the display device to which the optical compensation film is applied in accordance with the present invention.

Referring to FIG. 10 and FIG. 11, the light illuminating method from the backlight assembly 700 to the LCD panel assembly 300 and the film 200 for compensating the optical property will be described.

Referring to FIG. 10, the light is generated from the lamp assembly 520 into the light guiding plate 530 to be transformed into the surface light source distribution. Hereinafter, the light output from the light guiding plate 530 is defined as first light 515a.

The first light 515a having non-uniform brightness distribution is incident into the diffusing plate 420 to be diffused and transformed into second light 515c having uniform brightness distribution. Reference numeral 515b denotes light which is reflected by the reflecting plate 600.

The second light 515c has the uniform brightness distribution in comparison with the first light 515a. However, in the light transforming process for transforming the light to have the uniform brightness distribution, the light amount of the first light 515a directed to the LCD panel 360 is lowered, and thus the brightness is also lowered. In order to prevent the decrease of the brightness, the second light 515c passes through the prism sheet 410 formed on the upper surface of the diffusing plate 420 and is directed toward the LCD panel 360. Hereinafter, the light of which direction is compensated by the prism sheet 410 is defined as third light 515d.

The third light 515d having sufficient brightness and brightness uniformity has S wave and P wave. In one embodiment, the first polarizing plate 350 of the LCD panel 360 filters the S wave. Therefore, only the P wave passes through the first polarizing plate 350. The light which passes through the first polarizing plate 350 and has only the P wave, is defined as the fourth light 515e.

The fourth light 515e passes through the liquid crystal 330 between the TFT substrate 340 and the color filter substrate 320. Therefore, transmissivity of the fourth light 515e is changed. The fourth light 515e passes through RGB pixels of the color filter substrate 320 so as to be filtered. The filtered light of which transmissivity is changed is defined as fifth light 515f.

The fifth light 515f passes through the second polarizing plate 310 to be transformed into sixth light 515g. A visible image can be displayed with the sixth light 515g. Hereinafter, the sixth light 515g is defined again as a first display light.

The first display light 515g is incident into the first transparent film 217 of the film 200 for compensating the optical property. The first display light 515g reaches through two paths to the user's eyes.

In the first path, the first display light 515g which is incident into the first transparent film 217 reaches to the user's eyes through the second transparent film 210 coupled in direct contact with the first transparent film 217. In this case, when the first display light 515g passes through the first and second transparent films 217 and 210, the optical path is not changed. This is because the refractive index of the second transparent film 210 is substantially the same as that of the first transparent film 217, as described above. Hereinafter, the first display light 515g passing through the first path is defined as second display light 515i.

In the second path, the first display light incident into the first transparent film 217 reaches to the user's eyes through the second transparent film 210 that is not in direct contact with the first transparent film 217. In this case, the first display light 515g is outputted from the first transparent film 217 to the air, and then arrived at the second transparent film 210. When the first display light 515g is incident from the air on the second transparent film 210, the first display light 515g is refracted. Hereinafter, the first display light 515g passing through the second path is defined as third display light 515h, 515j.

In other words, the first display light 515g is transformed into the second display light 515i and the third display light 515h, 515j. Then, the second display light 515i and the third display light 515h, 515j reach to the user's eyes. The third display light 515h, 515j improves the visual angle property and remarkably reduces the gray scale inversion phenomenon.

Hereinafter, substantial usefulness of the film for compensating the optical property, as described above, will be described referring to a simulation result.

Table 1 shows conditions of examples to simulate functions of the film for compensating the optical property, which remarkably reduces the gray scale inversion phenomenon and improves the visual angle property.

TABLE 1

|  | First transparent film | Pixel pitch/ prism pitch | Refractive index of first transparent film | Refractive index of second transparent film | (α, β)(°) | h/H(%) |
|---|---|---|---|---|---|---|
| Comparing example 1 | No use of the first transparent film | | | | | |
| Comparing example 2 | No use | 300/30 μm | — | 1.49 | 45, 45 | 100% |
| Example 1 | Use | 300/30 μm | 1.49 | 1.49 | 45, 45 | 30% |
| Example 2 | Use | 300/30 μm | 1.49 | 1.49 | 45, 30 | 30% |

Figure 12A:
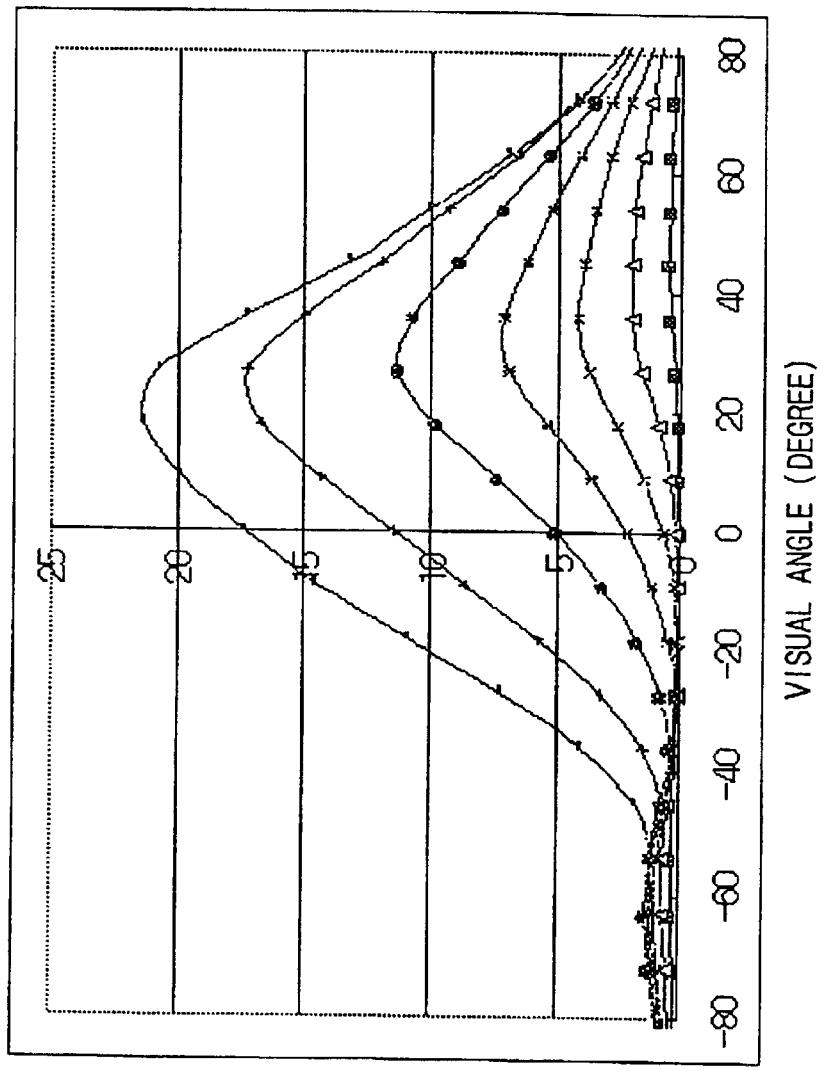
FIGS. 12A to 12C are graphs showing simulation results of a first comparison example of Table 1.
Figure 12B:
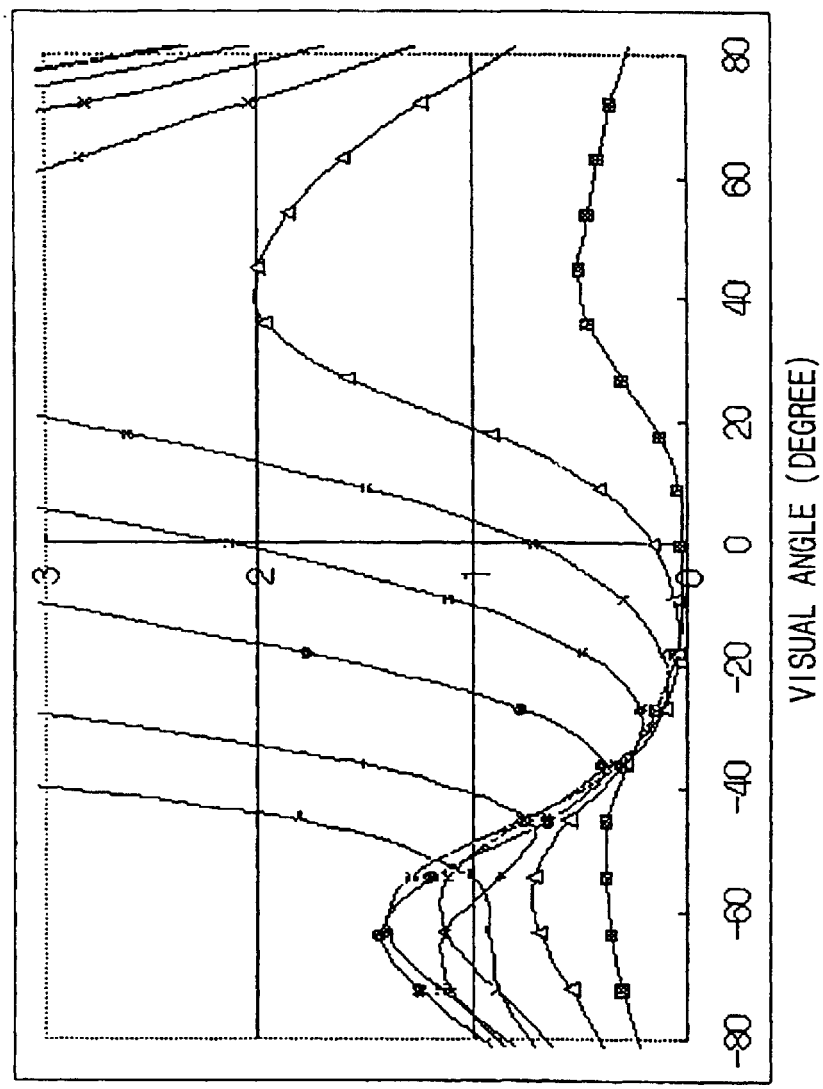
Figure 12C:
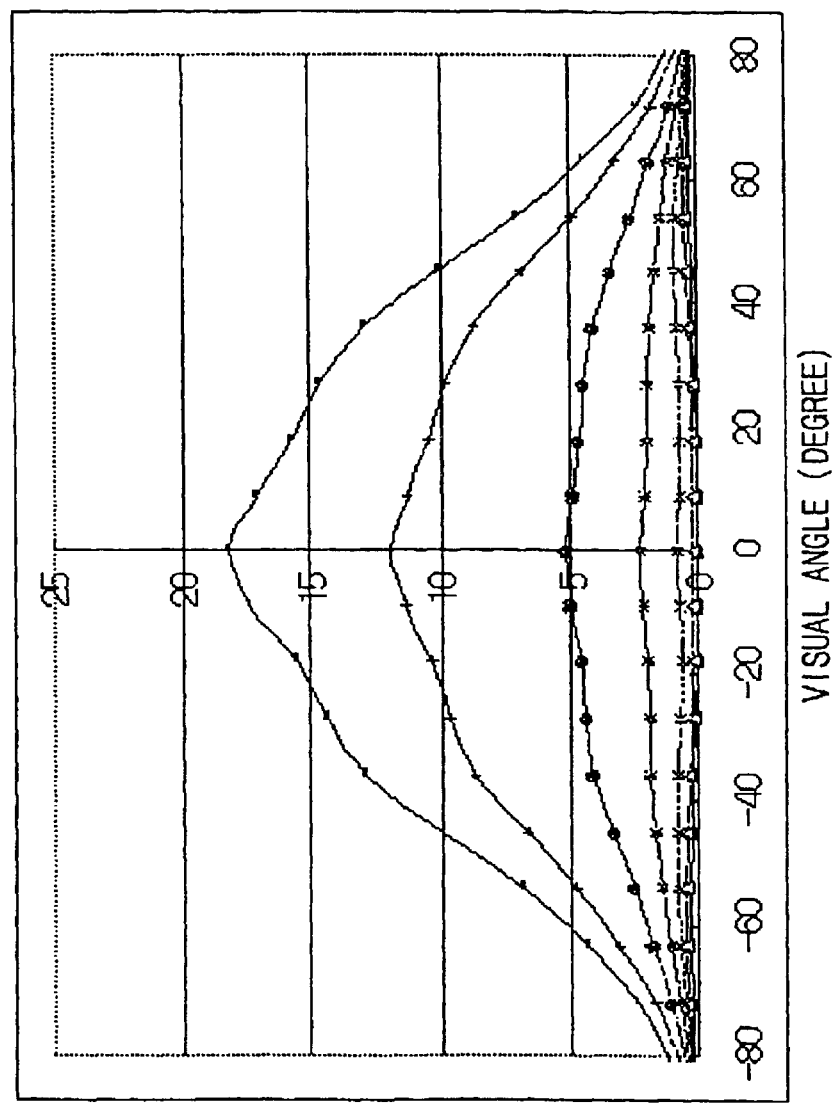

FIGS. 12A to 12C show the visual angle and the gray scale inversion phenomenon of an LCD device in the condition of comparing example 1 of Table 1, i.e., in a state that the film for compensating the optical property was not used in the LCD device.

Herein, FIG. 12A shows a visual angle distribution in upper and lower directions. FIG. 12C shows the visual angle distribution in right and left directions, and FIG. 12B is a partially enlarged view of the left portion of FIG. 12A.

FIG. 12B shows seven graphs that show the visual angle and the gray scale inversion phenomenon when seven gray scale voltage values (1.7V, 1.9V, 2.2V, 2.5V, 2.8V, 3.3V, 5.0V) selected from an extent of 1.7V to 5.0V were respectively applied.

Referring to FIG. 12B, in case the film for compensating the optical property was not used in the LCD device, although a higher gray scale voltage was applied, the gray scale inversion phenomenon, in which the brightness was lowered in the extent of −20 to −60, occurred.

Figure 13A:
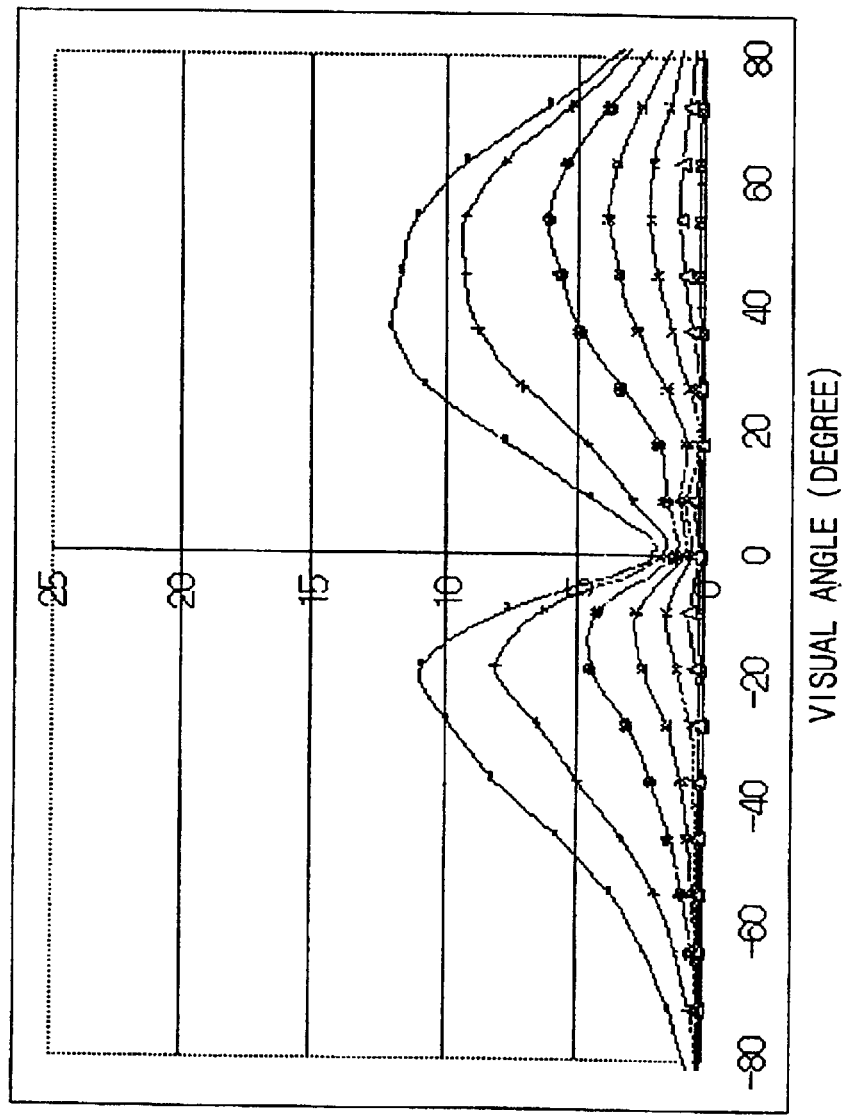

FIGS. 13A to 13C show graphs that show the visual angle and the gray scale phenomenon in the condition of the second comparing example of Table 1, i.e., in a state that the first transparent film 217 was not used in the LCD 800 and only the second transparent film 210 was used, or in a state that ratio h/H is 100% (referring to FIG. 8).

Herein, FIG. 13A shows a visual angle distribution in upper and lower directions. FIG. 13C shows the visual angle distribution in right and left directions, and FIG. 13B is a partially enlarged view of the left portion of FIG. 13A. There are also provided seven gray scale voltages.

Referring to FIGS. 13A and 13B, the front visual angle is nearly equal to zero (0). This means that the display operation was not performed in the front direction of the LCD device. This is a critical defect in the display device. As shown in FIG. 13C, the visual angle property in the right and left directions was also very low. However, the problem of the gray scale inversion phenomenon was improved in comparison with that of FIGS. 12A to 12C. In conclusion, a high display quality was not achieved with only the second transparent film 210.

Figure 14A:
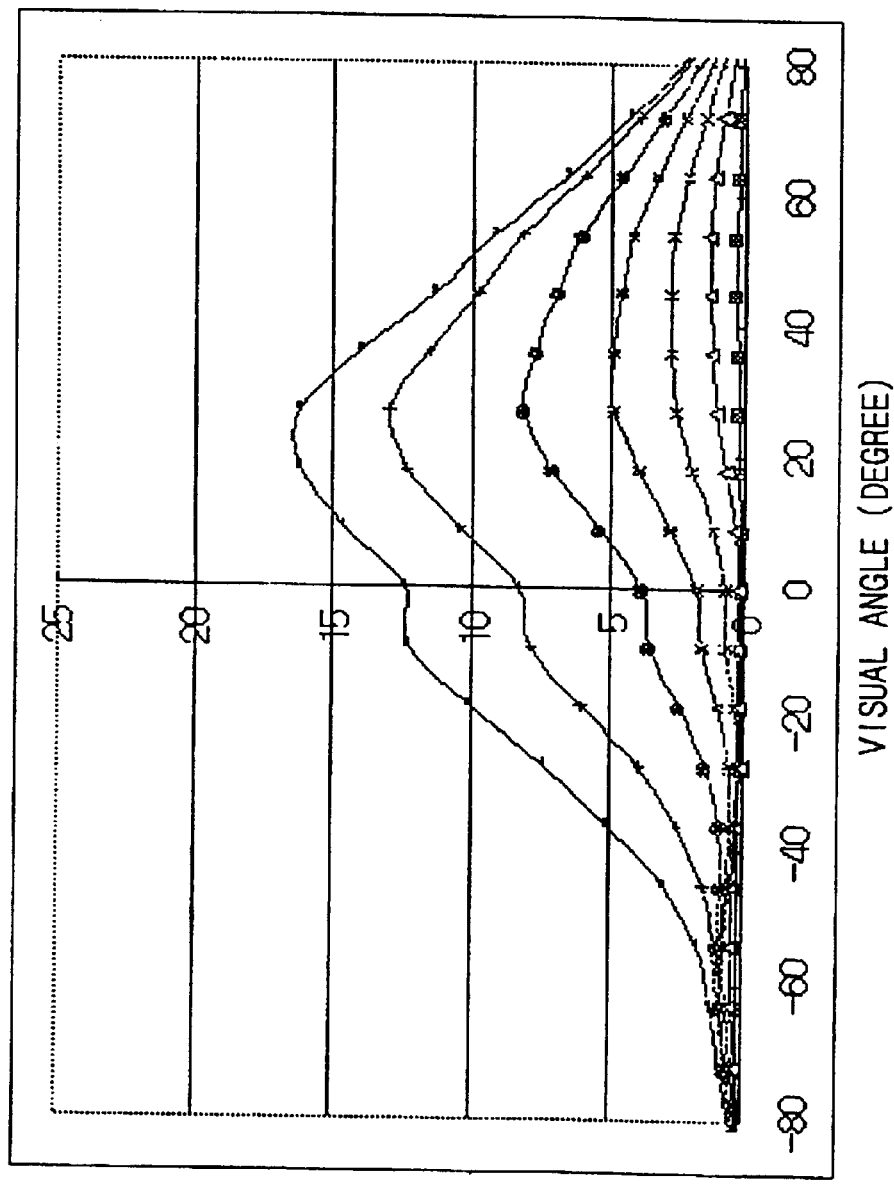
Figure 14B:
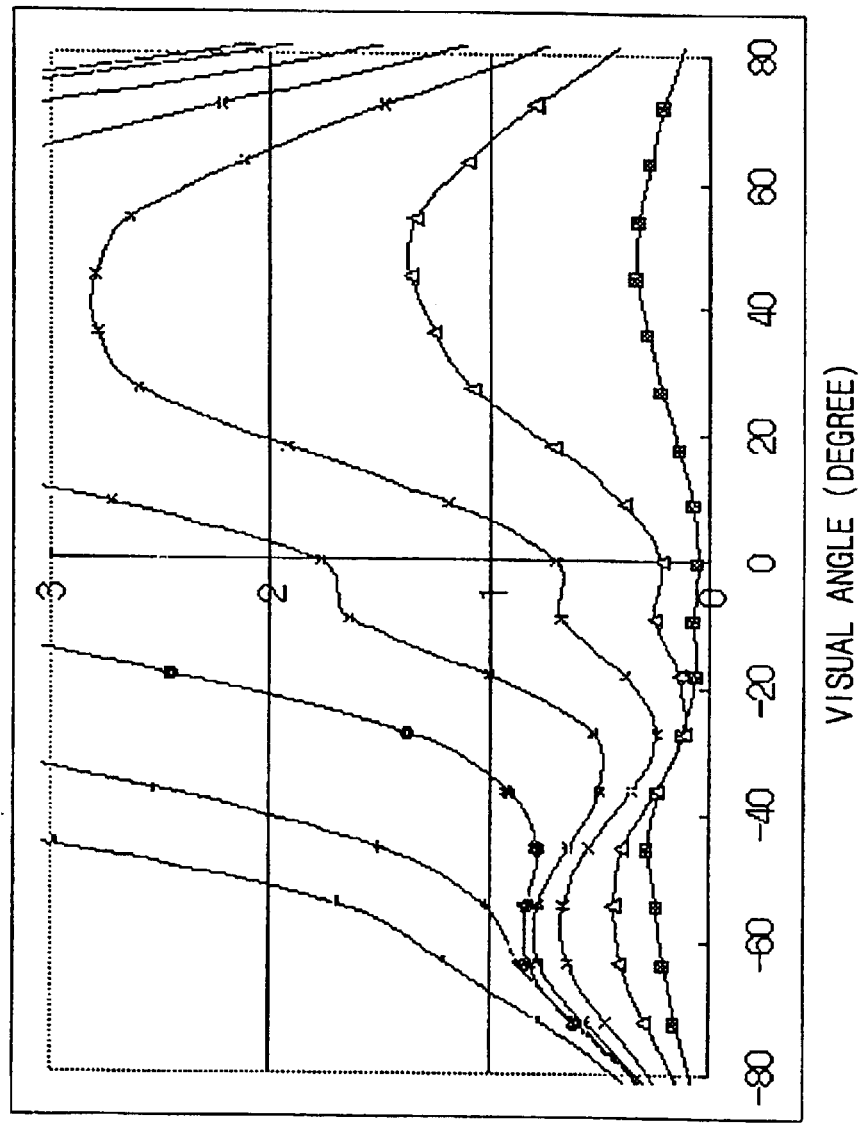

FIGS. 14A to 14C are graphs showing the visual angle and the gray scale phenomenon in the condition of Example 1 of Table 1, i.e., in a state that the film 200 for compensating the optical property, in which ratio h/H is 30%, was used on the upper face of the LCD device 800 (referring to FIG. 8).

Referring to FIGS. 14A and 14B, the front visual angle was remarkably improved in comparison with that of FIGS. 13A and 13B. Particularly, as shown in FIG. 14B, the gray scale inversion phenomenon hardly occurred. This means that the displaying quality was remarkably improved.

Figure 15A:
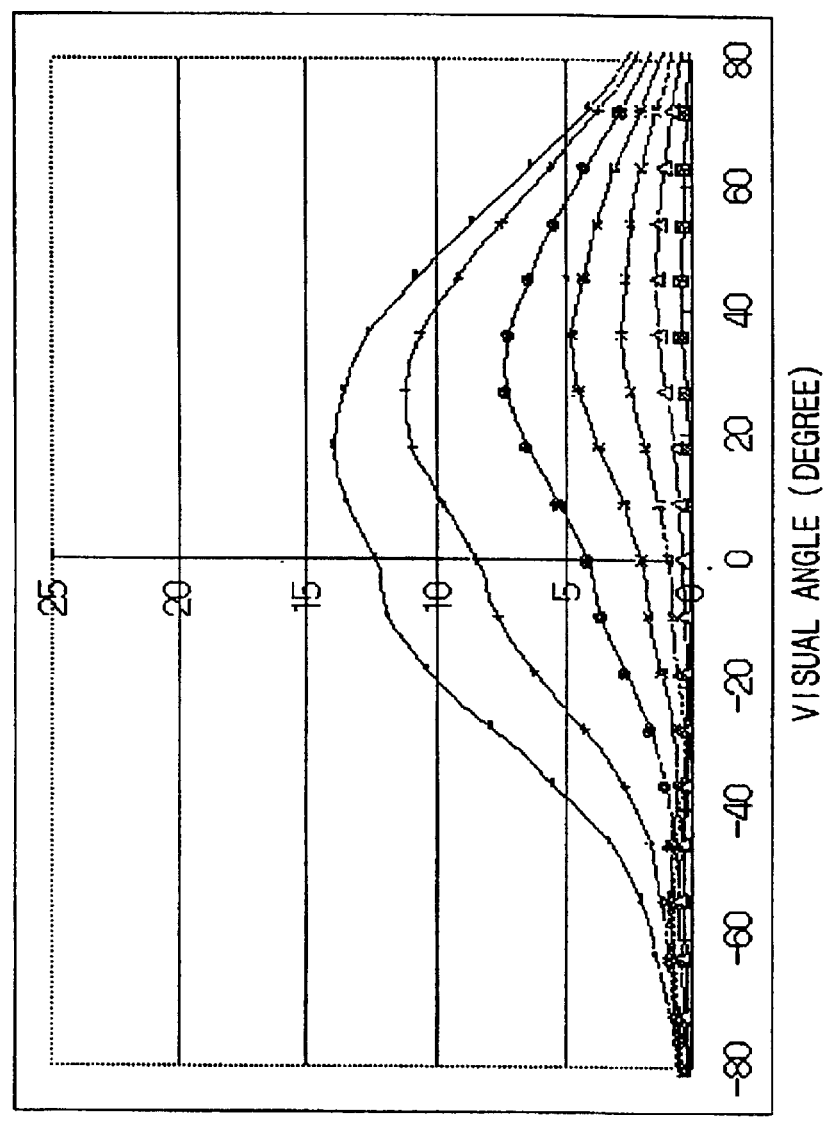
Figure 15C:
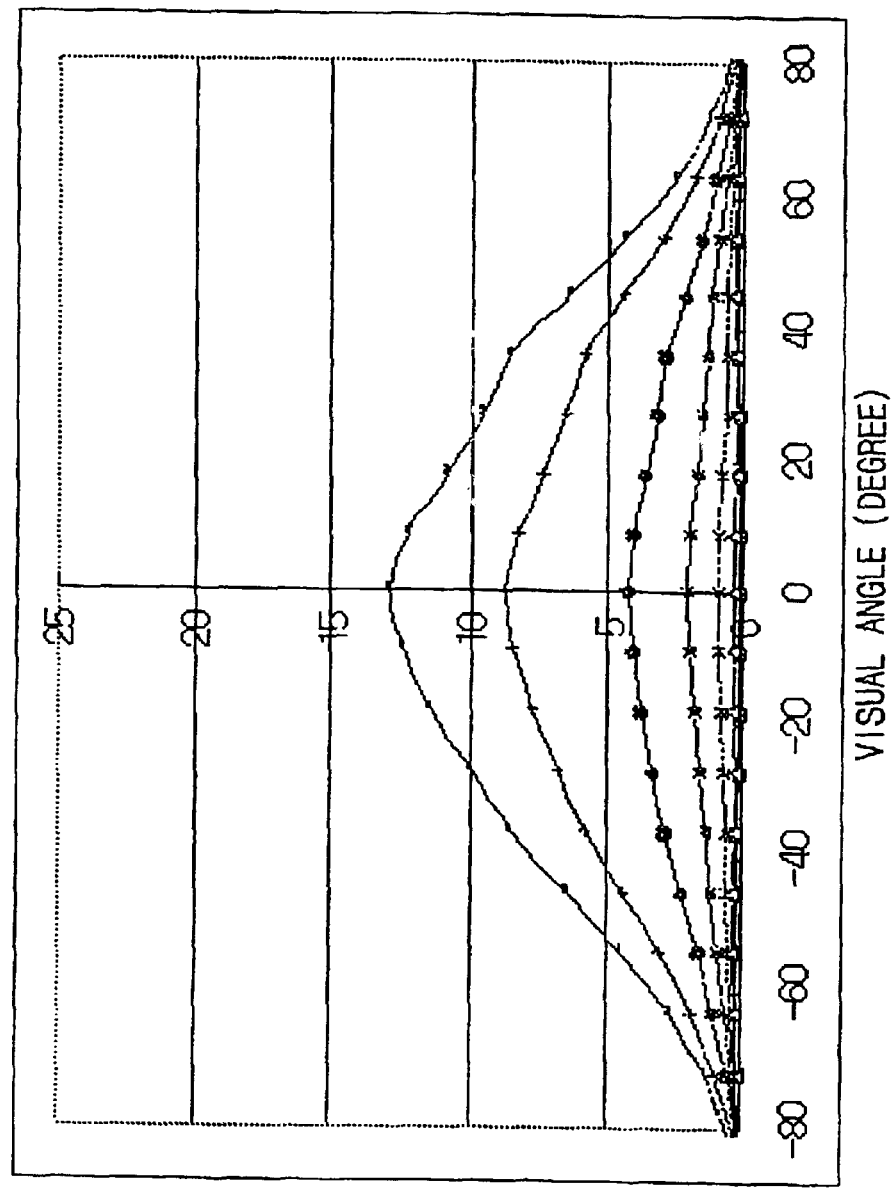

FIGS. 15A to 15C are graphs showing the visual angle and the gray scale phenomenon in the condition of Example 2 of Table 1, i.e., in a state that the film 200 for compensating the optical property, in which ratio h/H is 30% and the angles α and β are different from each other, was used on the upper face of the LCD device 800.

In an aspect of the brightness, there was a little difference between Examples 1 and 2. However, in Example 1, the front visual angle and the upper and lower visual angle were entirely and remarkably improved in comparison with that of Example 1. Also the problem of the gray scale inversion phenomenon was almost solved.

According to the present invention, the visual angle is remarkably improved and the gray scale inversion phenomenon is solved using the optical compensation film, thereby improving the display property. Further, the method of manufacturing the film is improved, thereby manufacturing a precise film for compensating the optical property with a simple method.

While the present invention has been described in detail, it should be understood that various changes, substitutions and alterations could be made hereto without departing from the spirit and scope of the invention as defined by the appended claims.

What is claimed is:

1. An optical compensation film comprising:
    a first transparent member formed on a substrate, the first transparent member having a recessed portion and a first refractive index; and
    a second transparent member formed on the first transparent member, the second transparent member having a protruded portion partly engaged with the recessed portion of the first transparent member, the second transparent member having a second refractive index which is substantially equal to the first refractive index,
    wherein light provided through the substrate passes in a first direction through an overlapped portion in which the protruded portion is in contact with the recessed portion, and the light passes in a second direction through a non-overlapped portion in which there is a gap between the protrusion portion of the second transparent member and the first transparent member, the first and second directions being different from each other.

2. The film of claim 1, wherein the first transparent member is made of fluid material which is cured depending on conditions applied to the fluid material, and the second transparent member is made of solid material to have a predetermined shape.

3. The film of claim 2, wherein the first transparent member is cured upon lapse of a selected time period.

4. The film of claim 2, wherein the first transparent member is cured by being exposed to ultraviolet radiation.

5. The film of claim 1, wherein the protruded portion has a prism pole shape having a first inclined surface and a second inclined surface which are in contact with each other at an edge of the protruded portion and are extended in a longitudinal direction of the protruded portion, and a plurality of protruded portions being successively arranged in parallel to each other.

6. The film of claim 5, wherein the first and second inclined surfaces have a following relationship:

$$\alpha+\beta<180°,$$

in which "α" is an angle between a horizontal plane and the first inclined surface and "β" is an angle between the horizontal plane and the second inclined surface, and angle "α" and angle "β" are within a range from about 10° to about 90°.

7. The film of claim 5, wherein the second transparent member has a round-corner portion between adjacent protruded portions.

8. The film of claim 1, wherein the non-overlapped portion satisfies ratio "h/H" of which value is within a range from about 0.05 to about 0.7, in which "H" is an entire height of the protruded portion and "h" is a height of the non-overlapped portion in which the protruded portion has no direct contact with the first transparent member.

9. The film of claim 1, wherein the plurality of protruded portions each have a polygonal pyramid shape having three or more side surfaces, the plurality of protruded portions being arranged in matrix configuration.

10. The film of claim 1, wherein the plurality of protruded portions each having a cone shape with a circular surface are arranged in matrix configuration.

11. The film of claim 1, wherein the substrate is a polarizing plate.

12. The film of claim 1, wherein a difference between the first refractive index and the second refractive index is lower than about 0.1.

13. An illuminating method in a display device, comprising the steps of:
  processing light generated from a light source to form display light for displaying an image, the display light being supplied in a first direction; and
  allowing a part of the display light to pass through a first position including two mediums having a substantially same refractive index so that the part of the display light advances in a first direction, and allowing the rest of the display light to pass through a second position including two mediums having different refractive indexes so that the rest of the display light advances in a second direction different from the first direction.

14. The method of claim 13, wherein the part of the display light passing through the first position passes a medium with a first refractive index and then a medium with a second refractive index which is substantially equal to the first refractive index, and the rest of the display light passing through the second position passes the medium with the first refractive index, a medium with a third refractive index which is different from the first refractive index, and the medium with the second refractive index.

15. The method of the claim 14, wherein a difference between the first refractive index and the second refractive index is about 0.1 or less, and a difference between the first or second refractive index and the third refractive index is more than about 0.1.

16. A liquid crystal display (LCD) device, comprising:
  an LCD panel assembly having an LCD panel in which a liquid crystal layer is interposed between two transparent substrates for controlling electric field therebetween, wherein light transmissivity of the liquid crystal layer varies depending on intensity of the electric field;
  an optical path changing film having:
    a substrate disposed on the LCD panel;
    a first transparent member formed on the substrate, the first transparent member having a first refractive index and a recessed portion; and
    a second transparent member having a protruded portion partly engaged with the recessed portion of the first transparent member, the
  second transparent member having a second refractive index which is substantially equal to the first refractive index; and
  a backlight assembly for providing light to the liquid crystal layer,
  wherein the light advances in a first direction at an overlapped portion where the protruded portion is in contact with the recessed portion and advances in a second direction different from the first direction at a non-overlapped portion where there is a gap between the protruded portion of the second transparent member and the first transparent member.

* * * * *